(12) United States Patent
Ellison et al.

(10) Patent No.: US 8,308,235 B2
(45) Date of Patent: Nov. 13, 2012

(54) VEHICLE SEAT ASSEMBLY

(75) Inventors: Terrie Ellison, Hilliard, OH (US); Trenton Hobbs, Marysville, OH (US); Derek Shane Lindsay, Marysville, OH (US); William J. Gross, Marysville, OH (US)

(73) Assignee: Honda Motor Co., Tokyo (JP)

( * ) Notice: Subject to any disclaimer, the term of this patent is extended or adjusted under 35 U.S.C. 154(b) by 398 days.

(21) Appl. No.: 12/722,375

(22) Filed: Mar. 11, 2010

(65) Prior Publication Data

US 2011/0221257 A1    Sep. 15, 2011

(51) Int. Cl.
*B60N 2/42*    (2006.01)

(52) U.S. Cl. ........... 297/216.1; 297/284.11; 297/452.21; 297/452.26; 297/452.27

(58) Field of Classification Search ............... 297/216.1, 297/284.11, 452.21, 452.26, 452.27
See application file for complete search history.

(56) References Cited

U.S. PATENT DOCUMENTS

| | | | |
|---|---|---|---|
| 2,789,621 A | 4/1957 | Langtry et al. | |
| 3,612,607 A | 10/1971 | Lohr | |
| 3,853,352 A | 12/1974 | Ambrose | |
| 3,915,493 A * | 10/1975 | Brown | 296/63 |
| 4,236,751 A | 12/1980 | Strien | |
| 4,521,057 A | 6/1985 | Varterasian et al. | |
| 4,583,782 A | 4/1986 | Mikuniya | |
| 4,623,192 A | 11/1986 | Koide et al. | |
| 4,726,086 A | 2/1988 | McEvoy | |
| 4,837,881 A | 6/1989 | Kondo et al. | |
| 4,854,643 A | 8/1989 | Cojocari et al. | |
| 4,930,171 A | 6/1990 | Frantz | |
| 5,189,747 A | 3/1993 | Mundy et al. | |
| 5,368,368 A | 11/1994 | Fukui et al. | |
| 5,400,490 A * | 3/1995 | Burchi | 29/91.1 |
| 5,542,747 A * | 8/1996 | Burchi | 297/452.55 |
| 5,564,144 A | 10/1996 | Weingartner et al. | |
| 5,850,645 A | 12/1998 | Ogawa et al. | |
| 6,226,819 B1 | 5/2001 | Ogawa et al. | |
| 6,481,801 B1 | 11/2002 | Schmale | |
| 6,511,562 B1 | 1/2003 | Coffield | |
| 6,571,411 B1 * | 6/2003 | Ebe | 5/653 |
| 6,625,830 B2 | 9/2003 | Lampel | |
| 6,663,178 B2 | 12/2003 | Fourrey et al. | |
| 6,755,475 B1 | 6/2004 | Tiesler et al. | |
| 6,786,541 B2 | 9/2004 | Haupt et al. | |

(Continued)

FOREIGN PATENT DOCUMENTS

EP    2123507    11/2009

(Continued)

OTHER PUBLICATIONS

Office Action of U.S. Appl. No. 12/722,360 dated Apr. 13, 2012.

(Continued)

*Primary Examiner* — Laurie Cranmer

(74) *Attorney, Agent, or Firm* — Rankin Hill & Clark LLP

(57) ABSTRACT

A vehicle seat assembly includes a seat back and a seat base extending forward from a lower end of the seat back. The seat base is formed of a first foam member extending laterally across the seat base to absorb loads and a second foam member formed over the first member to form a seating surface of the seat base. At least one wire frame section is secured to the first foam member and extends rearwardly therefrom toward a rear of the seat base for mounting the seat base to an associated vehicle body.

28 Claims, 4 Drawing Sheets

U.S. PATENT DOCUMENTS

| | | |
|---|---|---|
| 6,854,806 B2 | 2/2005 | Huse |
| 7,008,013 B2 | 3/2006 | Okamoto |
| 8,141,957 B2 | 3/2012 | McClung et al. |
| 2004/0245837 A1 | 12/2004 | Clifford |
| 2005/0140199 A1 | 6/2005 | Kang et al. |
| 2006/0001307 A1 | 1/2006 | Embach |
| 2007/0096534 A1 | 5/2007 | Davidson |
| 2008/0042482 A1* | 2/2008 | Weiss et al. ............... 297/378.1 |
| 2009/0066142 A1 | 3/2009 | Ventura et al. |
| 2009/0085384 A1 | 4/2009 | Galbreath et al. |
| 2009/0146472 A1 | 6/2009 | Galbreath et al. |

FOREIGN PATENT DOCUMENTS

| | | |
|---|---|---|
| FR | 2795371 | 9/2001 |

OTHER PUBLICATIONS

International Search Report and Written Opinion of PCT/US2011/027245 dated May 9, 2011.

U.S. Appl. No. 12/870,080, filed Aug. 27, 2010 and entitled "Vehicle Seat Assembly".

U.S. Appl. No. 12/722,360, filed Mar. 11, 2010 and entitled "Vehicle Seat Assembly".

U.S. Appl. No. 12/870,109, filed Aug. 27, 2010 and entitled "Vehicle Seat Assembly".

* cited by examiner

VEHICLE SEAT ASSEMBLY

BACKGROUND

The present disclosure generally relates to a vehicle seat assembly, and more particularly relates to a seat cushion having a rigid member anchored to a vehicle body.

Vehicle seat assemblies typically include a seat cushion fixed to a vehicle body and a seat back extending upwardly from a rearward portion of the seat cushion. In one conventional anti-submarine construction, a forward edge of the seat cushion is raised relative to the rearward edge. For example, a cross member can be provided under the forward edge to elevate it relative to a vehicle floor and the rearward edge of the seat cushion can be mounted directly to the vehicle floor. In this arrangement, the cross member, which can be formed of sheet metal, can absorb submarine loads imparted to the seat cushion during a vehicle collision event.

The seat cushion can comprise a wire frame and a foam member molded over the wire frame. It can be the wire frame of the seat cushion that is connected to the forward cross member. A rear portion of the wire frame of the seat cushion can be bolted or otherwise secured to the vehicle's floor panel or brackets mounted to the floor panel.

Some vehicle manufacturers employ an expanded polypropylene (EPP) foam member in their vehicle seat cushions. However, such seat assemblies often suffer in comfort. This is particularly a problem when minimal space is available between the rear end of the seat cushion and the vehicle body (e.g., the floor panel).

SUMMARY

An example of a vehicle seat assembly that can overcome the aforementioned shortcomings includes a seat back and a seat base extending forward from a lower end of the seat back. The seat base is formed of a first foam member extending laterally across the seat base to absorb loads and a second foam member formed over the first member to form a seating surface of the seat base. At least one wire frame section is secured to the first foam member and extends rearwardly therefrom toward a rear of the seat base for mounting the seat base to an associated vehicle body.

Another example of a vehicle seat assembly includes a seat base having a seat back extending upwardly therefrom. The seat base includes a first foam portion extending laterally across the seat base with a wire frame section connected to the first foam portion and extending longitudinally therefrom toward a rear of the seat base where the wire frame section is secured to a vehicle body component. The seat base further includes a second foam portion molded over the first foam portion and extending longitudinally therefrom toward the rear of the seat base to form a seating surface thereof.

In a further example, a method for constructing a vehicle seat assembly is provided. In the method according to this example, at least one wire frame section is provided for extending from a forward portion of the seat base longitudinally toward a rearward portion of the seat base. A laterally extending first foam member is overmolded on the at least one wire frame section adjacent a forward end of the at least one wire frame section. A second foam member is overmolded on the first foam member and the at least one wire frame section to form a seating portion of the seat base.

DETAILED DESCRIPTION

Figure 1:
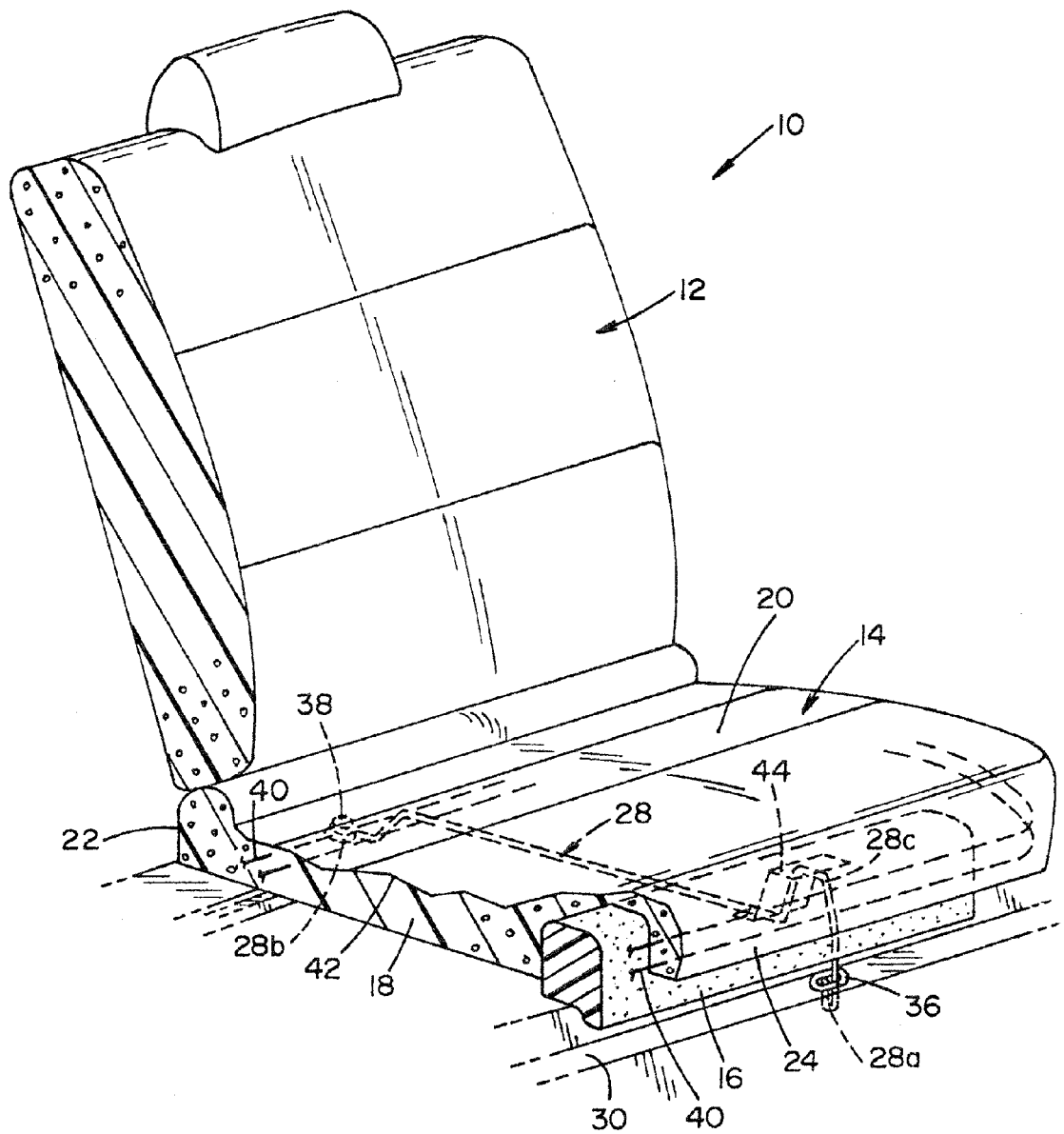
FIG. 1 is a perspective cross sectional view of a vehicle seat assembly having a first foam member extending laterally across a seat base and a second foam member formed over the first foam member.

Referring now to the drawings, wherein the showings are for purposes of illustrating one or more exemplary embodiments and not for purposes of limiting same, FIG. 1 shows a vehicle seat assembly 10 including a seat back 12 and a seat base 14 extending from a lower end of the seat back 12. The seat base 14, which can also be referred to as a seat cushion, includes and is formed of a first portion or member 16 extending laterally across the seat base 14 to absorb loads (e.g., submarine loads) and a second portion or member 18 formed over the first member 16 to form a seating surface 20 of the seat base 14. In particular, the second member 18 extends longitudinally from the first member 16 toward a rear or rear edge 22 of the seat base 14 to form the seating surface 20. A trim cover 42 can be received over the first and second members 16, 18, particularly over the second member 18 which is itself received over the first member 16.

In one embodiment, the first member 16 is formed of a relatively rigid material, such as a rigid foam, and the second member 18 is formed of a relatively less rigid material, such as a soft or less rigid foam. For example, the relatively rigid material of the first member 16 can be expanded polypropylene (EPP) foam and the relatively less rigid material of the second member 18 can be urethane foam. Providing the first member 16, which is formed of a more rigid material (e.g., EPP foam) along a forward portion 24 of the seat base 14 allows the first member 16 to absorb submarine loads and/or child restraint fixture loads, such as might be generated during a vehicle crash event. Providing the first member 16 only locally adjacent to the forward portion 24 allows comfort of the seat base 14 to be maintained through use of the second member 18 being formed of a less rigid material (e.g., urethane foam), while managing loads developed during a crash event.

Figure 3:
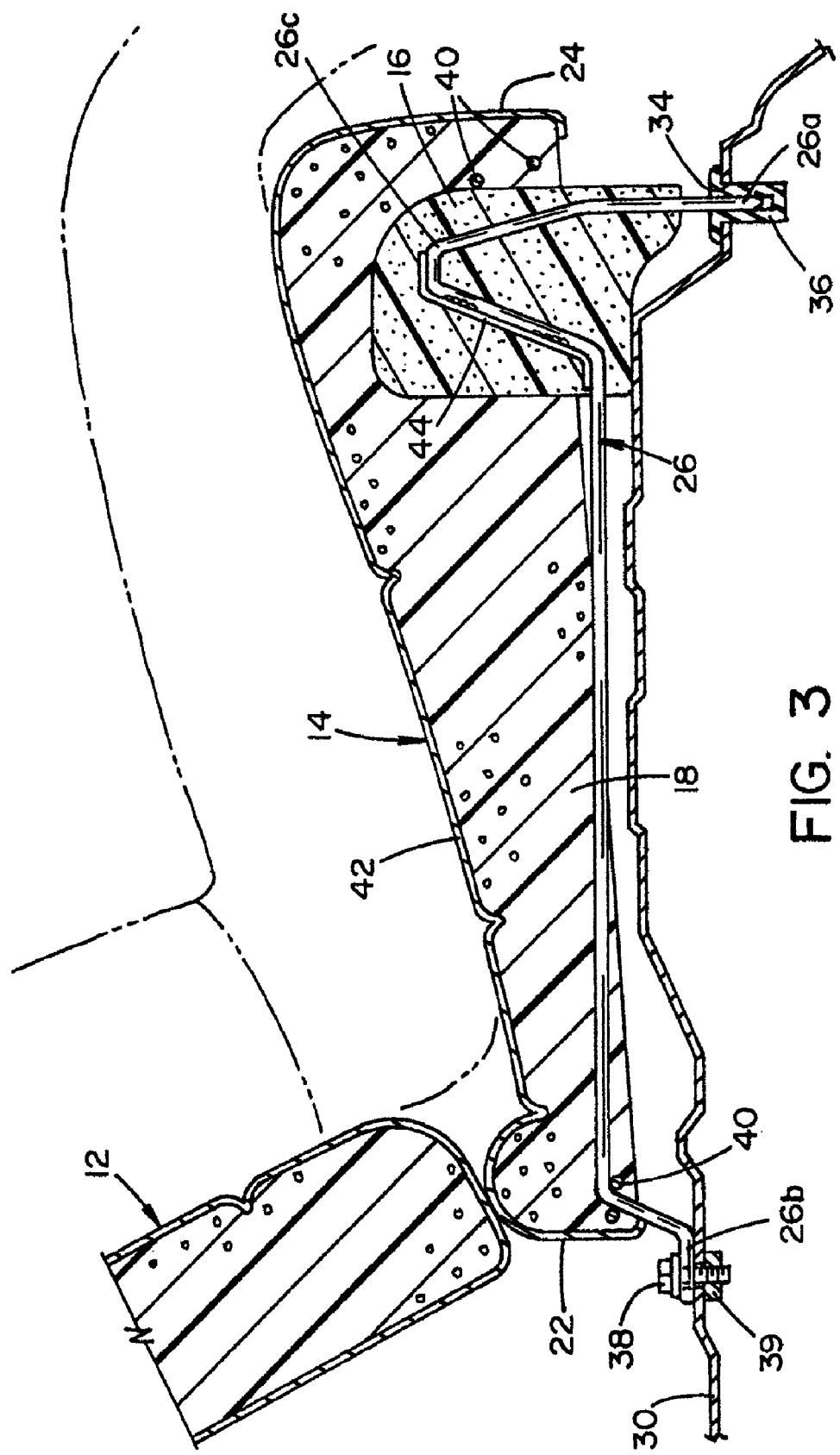
FIG. 3 is a cross sectional view of the vehicle seat assembly taken along the line 3-3 of FIG. 2.

As shown in the illustrated embodiment, the first foam member 16 can be an elongated member having a longitudinal length extending laterally across the seat base 14. In particular, the longitudinal length of the first member 16 can correspond closely to a lateral width of the seat base 14, though the first member 16 is slightly shorter. A width of the first member 16, by contrast, can be significantly smaller. For example, as best shown in FIG. 3, the width can be less than fifty percent of the front-to-back dimension of the seat base 14, preferably less than thirty-three percent of the front-to-back dimension, and more preferably approximately twenty-five percent of the front-to-back dimension. A height of the first member 16 can be such that it is nominally shorter than the seat base 14 adjacent the forward portion 24 but higher than the seat base 14 adjacent the rear 22.

Figure 2:
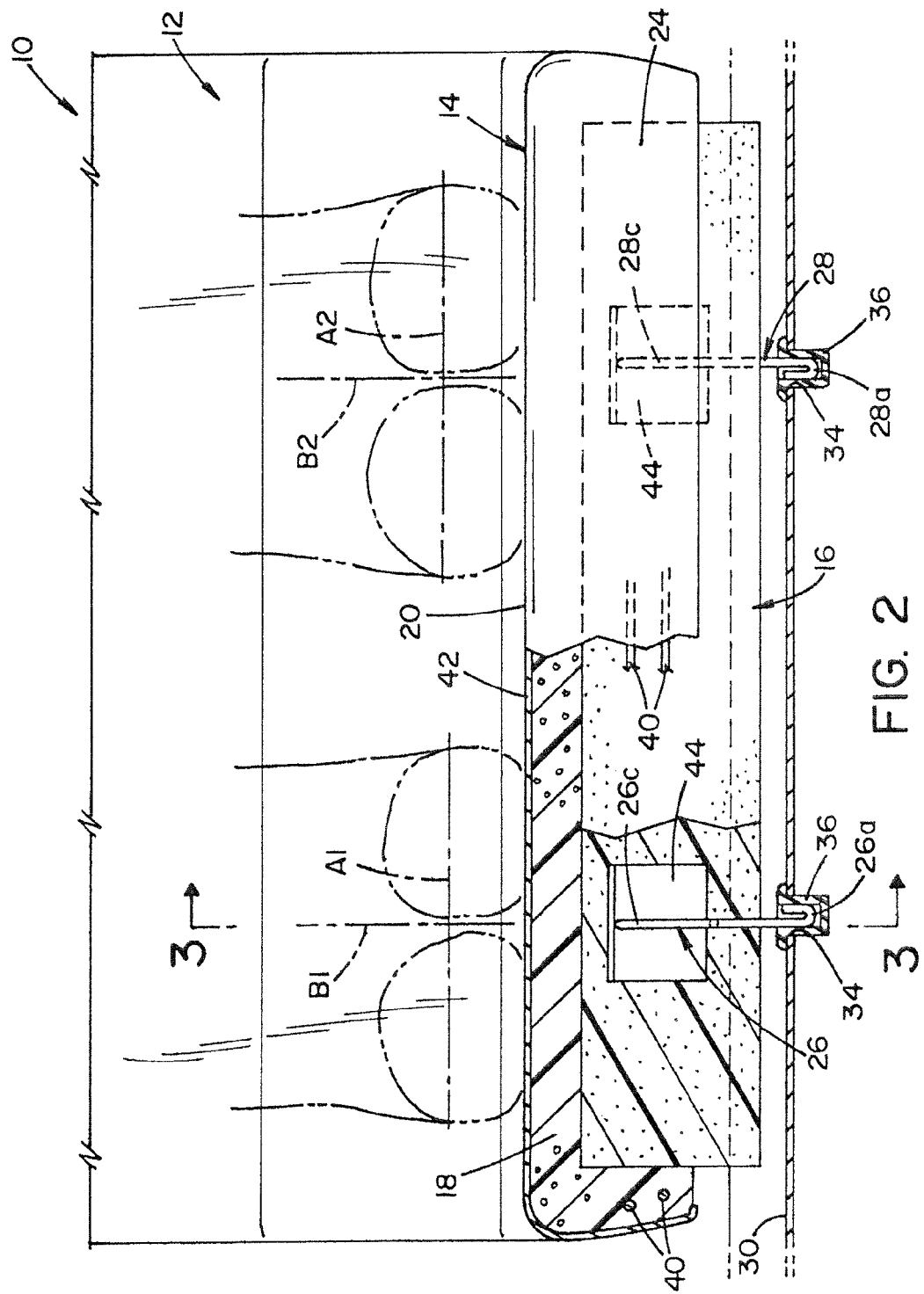
FIG. 2 is a front elevational view, partially in cross section, of the vehicle seat assembly.
Figure 4:
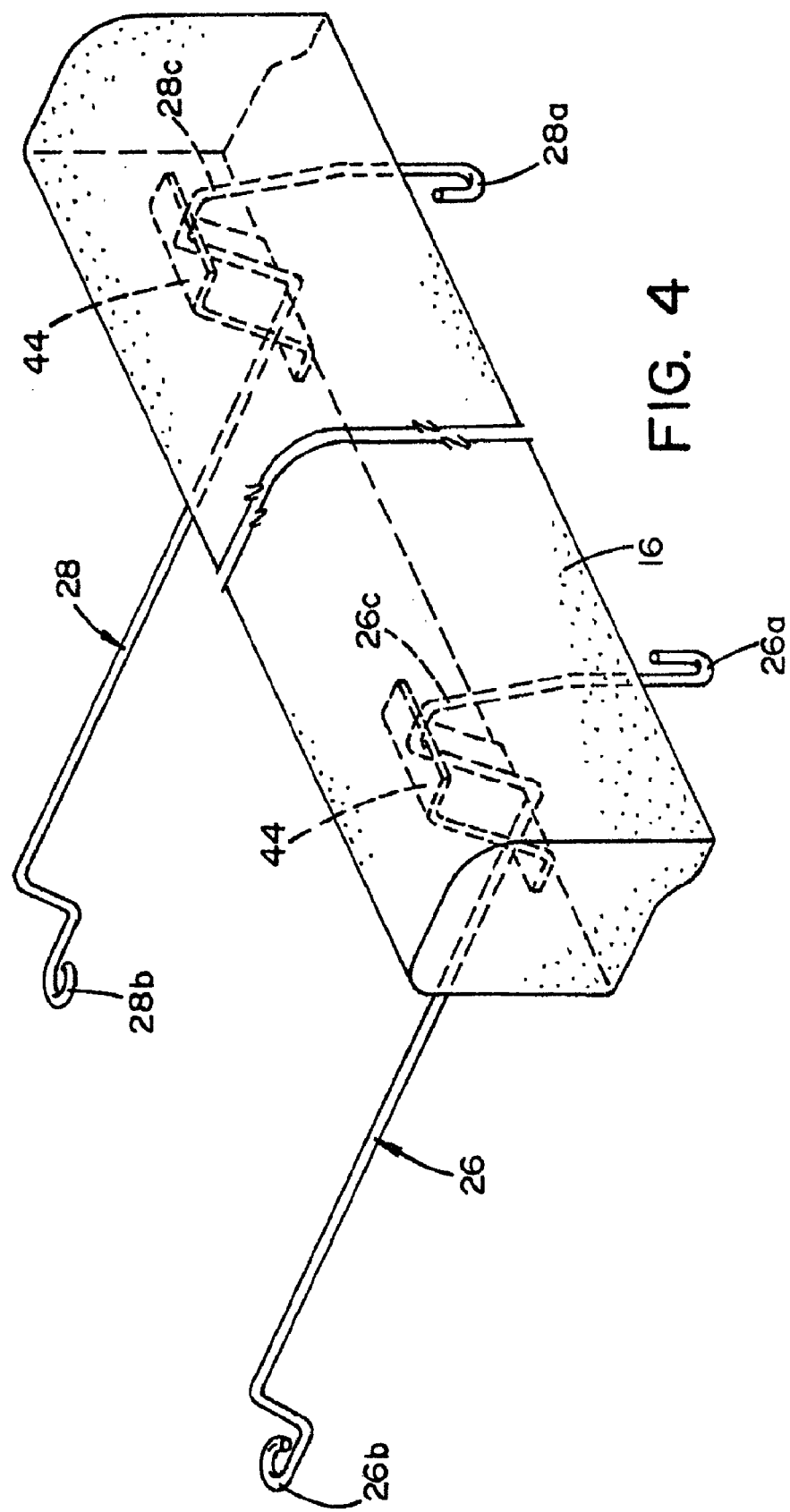
FIG. 4 is a perspective view of the first foam member and wire frame sections secured thereto shown in isolation from the vehicle seat assembly.

With additional reference to FIGS. 2-4, the vehicle seat assembly 10 further includes at least one wire frame section (e.g., wire frame sections 26 and 28) secured to the first member 16 and extending rearwardly therefrom toward the rear 22 of the seat base 14 for mounting the seat base to an associated vehicle body (e.g., floor panel 30). As described in more detail below, the at least one wire frame section can be laterally disposed at a B-location, which is located centrally along a hip point axis of the seat base 14. This can assist in transferring submarine loads or other loads (e.g., those of a child restraint fixture) from the first member 16 to the associated vehicle body at a location adjacent the rear 22 of the seat cushion or base 14.

In the illustrated embodiment, the at least one wire frame section of the vehicle seat assembly 10 includes a first wire section 26 and a second wire section 28. Accordingly, a pair of laterally spaced apart wire frame sections 26, 28 are provided, wherein the wire frame sections 26, 28 are connected to the first member 16 and extend longitudinally therefrom toward the rear 22 of the seat base 14 where the wire frame sections 26, 28 can be secured to the vehicle body component (e.g., floor panel 30). In the illustrated embodiment, the wire frame sections 26, 28 are each disposed centrally (i.e., at a B-location) along a respective hip point axis of the seat base 14.

More particularly, the first wire section 26 is laterally disposed at a B-location B1 of a first hip point axis A1 of the seat base 14 and the second wire frame section 28 is laterally disposed at a B-location B2 of a second hip point axis A2 of the seat base 14. As is known and understood by those skilled in the art, each hip point axis of the seat base 14 is located at a vertical location where an expected seat occupant's hip would be located (i.e., the pivot point between the torso and upper leg portions of a seat occupant's body). As used herein, hip point axis is an axis extending in a direction laterally across the vehicle and each hip point axis has a first lateral end and a second lateral end, the distance between the first and second lateral ends being an approximate width of the expected seat occupant. As used herein, B-location is a location disposed centrally along each hip point axis (i.e., located centrally between the first and second lateral ends of each hip point axis).

While the illustrated embodiment includes two wire frame sections 26, 28, it is to be appreciated that the seat base 14 could include only a single wire frame section or could include more than two wire frame sections. For example, in a seat base designed for only one occupant, the seat base would have only a single hip point axis with a single B-location or center location defined therealong. Accordingly, only a single wire frame section could be used. In a seat base designed for multiple occupants, the seat base could have a hip point axis located where each occupant is expected to be seated and each hip point axis could have its own B-location or center location. In this arrangement, a wire frame section could be provided at each B-location. Also in the illustrated embodiment, the vehicle body or vehicle body component is illustrated as the floor panel 30, however, it is to be appreciated that the wire frame sections 26, 28 could be secured to some other vehicle body component or to some intermediate component or bracket that is itself secured to the vehicle floor panel 30 or some other vehicle body component.

As shown in the illustrated embodiment, first ends 26*a*, 28*a* of the wire frame sections 26, 28 can be secured to the vehicle floor panel 30 adjacent the forward edge 24 of the seat base 14 and second ends 26*b*, 28*b* can be secured to the vehicle floor panel 30 adjacent the rearward edge 22 of the seat base 14. Respective portions 26*c*, 28*c* can be secured via overmolding to the first member 16 for transferring submarine loads (or other loads, e.g., child restraint device loads) absorbed thereby to the vehicle floor panel 30. In particular, the portions 26*c*, 28*c* can be formed with an inverted U or V-shape that provides for better interlocking by the overmolded first member 16. As best shown in FIG. 3, the rear ends 26*b*, 28*b* of the wire frame sections 26, 28 are secured to the vehicle body component or floor panel 30 adjacent the rear end 22 of the seat base 14 and forward ends 26*a*, 28*a* are secured to the vehicle body component (e.g., floor panel 30) or another vehicle body component (e.g., a bracket mounted to the floor panel 30) adjacent the forward end 24 of the seat base 14 below the first member 16 in the illustrated embodiment.

More specifically, in the illustrated embodiment, the floor panel 30 defines receiving apertures 34 in which the forward ends 26*a*, 28*a* are received for connecting to the floor panel 30, though this could be another vehicle body component. In particular, grommets 36 can facilitate connection of the forward ends 26*a*, 28*a* to the floor panel 30. To facilitate this connecting, the forward ends 26*a*, 28*a* can include hooked portions as shown in the illustrated embodiment. The rearward ends 26*b*, 28*b* of the wire frame sections 26, 28 can be formed as looped portions for receipt of bolts 38. In particular, bolts 38 can be received through looped end portions 26*b*, 28*b* of the wire frame sections 26, 28 for securing the same to the floor panel 30 (or to another vehicle body component) as best shown in FIG. 3. A threaded member, such as nut 39, can be threadedly secured to the bolt 38 thereby connecting the wire frame section 26 or 28 to the floor panel 30. Of course, other connection means and devices can be used to secure the rearward ends 26*b*, 28*b* to the vehicle body component.

The first member 16 can be overmolded onto the wire frame sections 26, 28. In particular, the first member 16 can be overmolded onto the inverted U-shaped portions 26*c*, 28*c* of the wire frame sections 26, 28. These portions 26*c*, 28*c* can be shaped (as shown in the illustrated embodiment) to facilitate a secure attachment between the overmolded first member 16 and the wire frame sections 26, 28. The second member 18 can then be overmolded onto at least one of the first member 16 and the wire frame sections 26, 28. In the illustrated embodiment, the second member 18 is overmolded onto both the first member 16 and the wire frame sections 26, 28.

If desired, the vehicle seat assembly 10, and particularly the seat base 14 thereof, can include another wire frame section 40 which is overmolded by the second member 18. In particular, the wire frame section 40 can be provided about a perimeter of the seat cushion or base 14 and provide a structure on which to overmold the second member 18. Additionally, as best shown in FIG. 3, the longitudinally extending wire frame sections 26, 28 can pass through and interengage the wire frame 40 adjacent the rear end 22 of the seat base 14.

A plate member 44 can be provided in association with each wire frame section 26, 28. In the illustrated embodiment, each plate member 44 is disposed along a rearward section of the portions 26*c*, 28*c* of the wire frame sections 26, 28. The plate 44 functions to prevent the wire frame section 26 or 28 from tearing or ripping through the first member 16 during a collision event. Each plate 44 can be welded onto the corresponding wire frame section 26, 28 or otherwise secured in position. In the illustrated embodiment, the plate 44 has a first end portion secured to the extending portion of the at least one wire section, a second end portion secured to a base of the inverted U-shaped portion 26*c* or 28*c*, and a middle portion secured to leg or rearward section of the inverted U-shaped portion 26*c* or 28*c*. Alternatively, the plate 44 can be overmolded in position by the first member 16 or could be secured to the frame 40.

A method for constructing a vehicle seat assembly will now be described, such as the vehicle seat assembly 10 of the illustrated embodiment. First, at least one wire frame section is provided for extending from the forward portion of the seat base longitudinally toward a rearward portion of the seat base. In the illustrated embodiment, the wire frame sections 26, 28 are provided and both extend from the forward portion 24 of the seat base 14 longitudinally toward the rearward portion 22 of the seat base 14. Next, a laterally extending first member, such as first foam member 16, is overmolded on the wire frame sections 26, 28, particularly overmolded adjacent forward end 24 of the wire frame sections 26, 28. Plates 44 can be secured to the wire frame sections 26, 28 or otherwise positioned to prevent tearing of the first member 16 during a collision event (i.e. a loading event). Then, the second member 18 is overmolded on the first member 16 and the wire frame sections 26, 28 to form a seating portion of the seat base 14.

A trim cover 42 can be installed over the first and second members 16, 18. As already described herein, the first member 16 can be an EPP foam and the second member 18 can be a urethane foam. Additionally, overmolding of the first member 16 can include positioning the wire frame sections 26, 28 at hip point locations of the seat base 14 (i.e., where an occupant's hip points are expected to be on the seat base 14).

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat assembly, comprising:
a seat back;
a seat base extending forward from a lower end of said seat back, said seat base formed of a first foam member extending laterally across said seat base to absorb loads and a second foam member formed over said first member to form a seating surface of said seat base; and
at least one wire frame section secured to said first foam member and extending rearwardly therefrom toward a rear of said seat base for mounting said seat base to an associated vehicle body, wherein said at least one wire frame section includes a first end secured to said associated vehicle body adjacent a forward edge of said seat base and a second end secured to said associated vehicle body adjacent a rearward edge of said seat base, said at least one wire frame section transferring submarine loads absorbed by said first foam member to said associated vehicle body.

2. The vehicle seat assembly of claim 1 wherein said first foam member is formed of a relatively rigid material and said second foam member is formed of a relatively less rigid material.

3. The vehicle seat assembly of claim 2 wherein said relatively rigid material is expanded polypropylene foam and said relatively less rigid material is urethane foam.

4. The vehicle seat assembly of claim 1 wherein said seat base has at least one hip point axis with a first lateral end and a second lateral end, said at least one wire frame section is laterally disposed at a B-location of each of said at least one hip point axis.

5. The vehicle seat assembly of claim 4 wherein said at least one wire frame section includes a first wire section and a second wire section, and wherein said at least one hip point axis includes a first hip point axis and a second hip point axis, said first wire section laterally disposed at a B-location of said first hip point axis and said second wire section laterally disposed at a B-location of said second hip point axis.

6. The vehicle seat assembly of claim 1 wherein the associated vehicle body is a floor panel and said second end of said at least one wire frame section is bolted to said floor panel.

7. The vehicle seat assembly of claim 1 wherein said first foam member is overmolded onto said at least one wire frame section.

8. The vehicle seat assembly of claim 7 wherein said second foam member is overmolded onto at least one of said first foam member and said at least one wire frame section.

9. The vehicle seat assembly of claim 8 wherein the second foam member is overmolded directly onto said at least one wire frame.

10. The vehicle seat assembly of claim 1 wherein each of said at least one wire frame section includes the first end secured to said associated vehicle body under a front end of said seat base, an inverted U-shaped section adjacent said first end embedded in said first foam member, an extending portion extending from said first foam member to a rear end of said seat base, and the second end secured to said associated vehicle body rearwardly of said seat base, an open side of the inverted U-shaped section faces downward toward the associated vehicle body.

11. The vehicle seat assembly of claim 10 wherein a plate is fixedly secured to said inverted U-shaped section.

12. The vehicle seat assembly of claim 11 wherein said plate has a first end portion secured to said extending portion, a second end portion secured to a base of said inverted U-shaped section and a middle portion secured to a leg of said inverted U-shaped section.

13. The vehicle seat assembly of claim 1 further including another wire frame section overmolded by said second foam member.

14. The vehicle seat assembly of claim 1 wherein said first foam member is substantially spaced apart from a rear of said seat base and is disposed only along a forward edge of said seat base.

15. A vehicle seat assembly, comprising:
a seat back;
a seat base extending forward from a lower end of said seat back, said seat base formed of a first foam member extending laterally across said seat base to absorb loads and a second foam member formed over said first member to form a seating surface of said seat base;
at least one wire frame section secured to said first foam member and extending rearwardly therefrom toward a rear of said seat base for mounting said seat base to an associated vehicle body; and
a plate secured to said at least one wire frame section for preventing the at least one wire frame section from ripping through said first foam member during a collision event.

16. A vehicle seat assembly, comprising:
a seat base having a seat back extending upwardly therefrom, said seat base including a first foam portion extending laterally across said seat base with a wire frame section connected to said first foam portion and extending longitudinally therefrom to a rear of said seat base where said wire frame section is secured to a vehicle body component, said seat base further including a second foam portion molded over said first foam portion and extending longitudinally therefrom toward said rear of said seat base to form a seating surface thereof.

17. The vehicle seat assembly of claim 16 wherein said first foam portion is formed of a rigid foam and said second foam portion is formed of a less rigid foam.

18. The vehicle seat assembly of claim 16 wherein said seat base includes at least one hip point axis and said wire frame section is disposed centrally along each of said at least one hip point axis of said seat base.

19. The vehicle seat assembly of claim 18 wherein said seat base includes at least two hip point axes each having a first lateral end and a second lateral end, center points of said at least two hip point axes spaced apart from one another.

20. The vehicle seat assembly of claim 16 wherein said wire frame section has a rear end secured to said vehicle body component adjacent a rear end of said seat base and a forward end secured to said vehicle body component or another vehicle body component adjacent a forward end of said seat base below said first foam portion.

21. The vehicle seat assembly of claim 16 wherein a plate is fixedly secured to said rear end of said wire frame section.

22. The vehicle seat assembly of claim 16 wherein the first foam portion is substantially spaced apart from a rear of said seat base and is disposed only along a forward edge of said seat base.

23. The vehicle seat assembly of claim 16 wherein the second foam portion is molded directly onto said wire frame section.

24. A method for constructing a vehicle seat assembly, comprising:
   providing at least one wire frame section for extending from a forward portion of a seat base longitudinally toward a rearward portion of said seat base;
   overmolding a laterally extending first foam member on said at least one wire frame section adjacent a forward end of said at least one wire section;
   overmolding a second foam member on said first foam member and said at least one wire frame section to form a seating portion of said seat base; and
   securing a first end of said at least one wire section to an associated vehicle body and securing second end of said at least one wire section to the associated vehicle body adjacent a rearward edge of said seat base for transferring submarine loads.

25. The method of claim 24 further including:
   installing a trim cover over said first and second foam members.

26. The method of claim 24 wherein said first foam member is an expanded polypropylene foam and said second foam member is a urethane foam.

27. The method of claim 24 wherein said overmolding of said first foam member includes positioning said at least one wire frame section in a lateral center of at least one hip point axis of said seat base.

28. The method of claim 24 further including securing a plate to said wire frame section for preventing ripping through the first foam member.

* * * * *